United States Patent
Kojima et al.

(10) Patent No.: US 10,163,005 B2
(45) Date of Patent: Dec. 25, 2018

(54) DOCUMENT STRUCTURE ANALYSIS DEVICE WITH IMAGE PROCESSING

(71) Applicant: IMatrix Corp., Kawasaki (JP)

(72) Inventors: Mitsuo Kojima, Kawasaki (JP); Atsushi Yokoyama, Kawasaki (JP); Tatsuo Suzuki, Kawasaki (JP); Shohei Numata, Kawasaki (JP)

(73) Assignee: IMatrix Corp., Kawasaki (JP)

( * ) Notice: Subject to any disclaimer, the term of this patent is extended or adjusted under 35 U.S.C. 154(b) by 0 days.

(21) Appl. No.: 15/996,180

(22) Filed: Jun. 1, 2018

(65) Prior Publication Data

US 2018/0276459 A1     Sep. 27, 2018

Related U.S. Application Data

(63) Continuation of application No. PCT/JP2015/085603, filed on Dec. 21, 2015.

(51) Int. Cl.
G06K 9/00 (2006.01)
H04L 12/58 (2006.01)
G06F 13/00 (2006.01)

(52) U.S. Cl.
CPC ......... *G06K 9/00456* (2013.01); *G06F 13/00* (2013.01); *G06K 9/00463* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 8,762,302 B1* | 6/2014 | Spivack | G06N 5/046 706/12 |
| 9,565,209 B1* | 2/2017 | Grzonkowski | H04L 63/1416 |
| 2008/0244384 A1 | 10/2008 | Yoshitani | |
| 2009/0254572 A1* | 10/2009 | Redlich | G06Q 10/06 |
| 2010/0161748 A1 | 6/2010 | Kojima et al. | |
| 2015/0381533 A1* | 12/2015 | Klemm | H04L 51/02 709/206 |
| 2017/0005962 A1* | 1/2017 | Lewin-Eytan | H04L 51/12 |

FOREIGN PATENT DOCUMENTS

| | | |
|---|---|---|
| JP | 61002583 A | 1/1986 |
| JP | 2008242543 A | 10/2008 |
| JP | 2009251864 A | 10/2009 |
| JP | 2011090442 A | 5/2011 |

* cited by examiner

*Primary Examiner* — Dwayne D Bost
*Assistant Examiner* — Jiangeng Sun
(74) *Attorney, Agent, or Firm* — Slater Matsil, LLP

(57) ABSTRACT

A mail processing apparatus includes a data retrieving section for retrieving sample data from e-mail and/or a network NW, a signalizing section for converting the sample data form the data retrieving section into n-value, a sample storage section for storing n-value data converted by the signalizing section, a signal processing section for comparing the n-value sample data stored in the sample storage section with an inputted e-mail to judge whether or not the e-mail is spam mail based on the degree of similarity, and a spam storing section for storing the spam mail based on the judgment result.

9 Claims, 25 Drawing Sheets management table

| identification information | format information | date information | storing address |
|---|---|---|---|
| sample data S1 | n1 row × m1 column | 10:10 Aug 12 | C:¥¥sample¥S1 |
| sample data S2 | n2 row × m2 column | 10:22 Aug 12 | C:¥¥sample¥S2 |
| sample data S3 | n3 row × m3 column | 11:34 Aug 12 | C:¥¥sample¥S3 |
| ... | ... | ... | ... |
| ... | ... | ... | ... |
| sample data Sn | nk row × mk column | 21:34 Aug 16 | C:¥¥sample¥Sn |

FIG. 2C

Portuguese

A XXXXXXX CONSULTORIA desde 2003 no mercado de recuperação de credito.
Tenha seu nome limpo em até 3 dias sem ter que pagar suas contas.

CLIQUE AQUI E SOLICITE UMA CONSULTA SERASA GRATIS.
Não resposta esse e-mail entre em contato através desse e-mail.
E-mail: Sac@carvalho-xxxxxxx.com Site: www.aAesDNU7-xxxxxxxx.com
Telefone: xx-xxxx2673
Skype: xxxx.xxxxxxx991
Clique aqui para deixar de receber estes e-mails Xangai Host - Envio de Emails com Qualidade Reportar SPAM
Imagem

FIG. 8A

English

A CONSULTING XXX since 2003 in the recovery of credit market.
Have your name cleared within 3 days without having to pay your bills.

CLICK HERE TO REQUEST A FREE CONSULTATION SERASA.
Do not answer this e-mail contact through this email.
E-mail: Sac@carvalho-xxxxxxx.com Site: www.2Pp8WcGK-xxxxxxxx.com
Phone: xx-xxxx2673
Skype: xxxx.xxxxxxx991
Click here to stop receiving these emails Shanghai Host - Sending Emails with Quality report spam
image

FIG. 8B

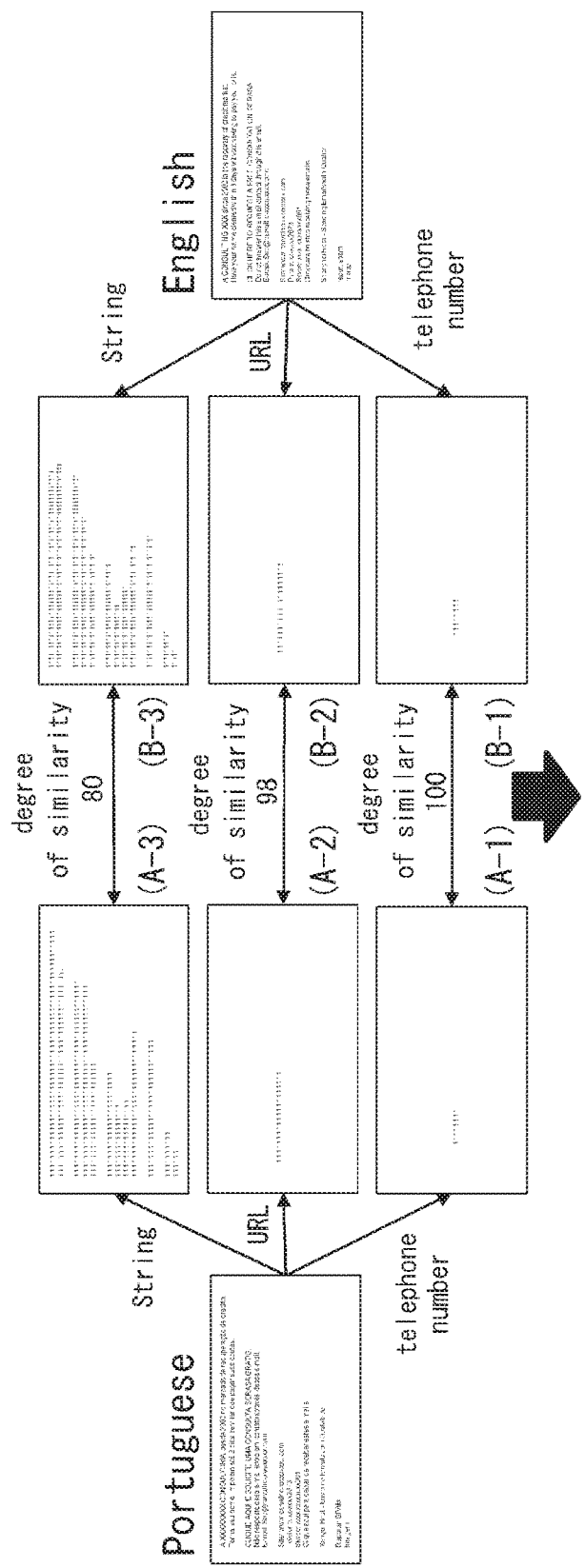

1)

You had received the payment order !

Delivered at: Tue, 28 Jul 2015 15:37:35 +0000.
Amount of sheets: 4.
Addresser ID: 87934105172.
Dispatch No.: 731331.

Regards
Simon

RPA xxxxxxx Ltd
34 xxxxxxxxx Road
xxxxxxxxx Industrial Estate
Shoeburyness
Essex SS3 xxx

You had received the payment order !

Delivered at: Tue, 28 Jul 2015 15:38:42 +0000.
Amount of sheets: 3.
Addresser ID: 87933605165.
Dispatch No.: 731161.

Regards
Eric

RPA xxxxxxx Ltd
34 xxxxxxxxx Road
xxxxxxxxx Industrial Estate
Shoeburyness
Essex SS3 xxx

FIG. 11B

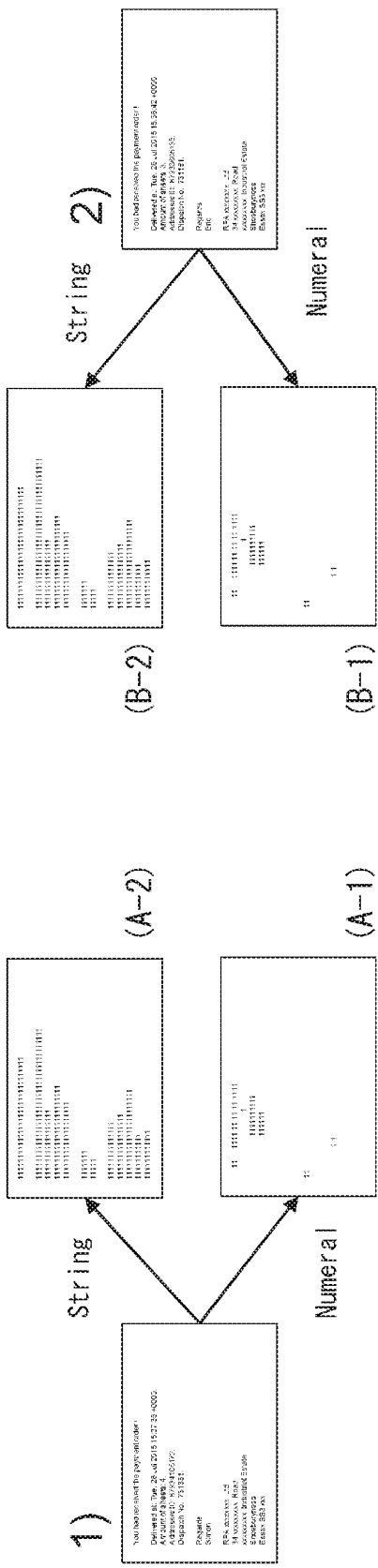

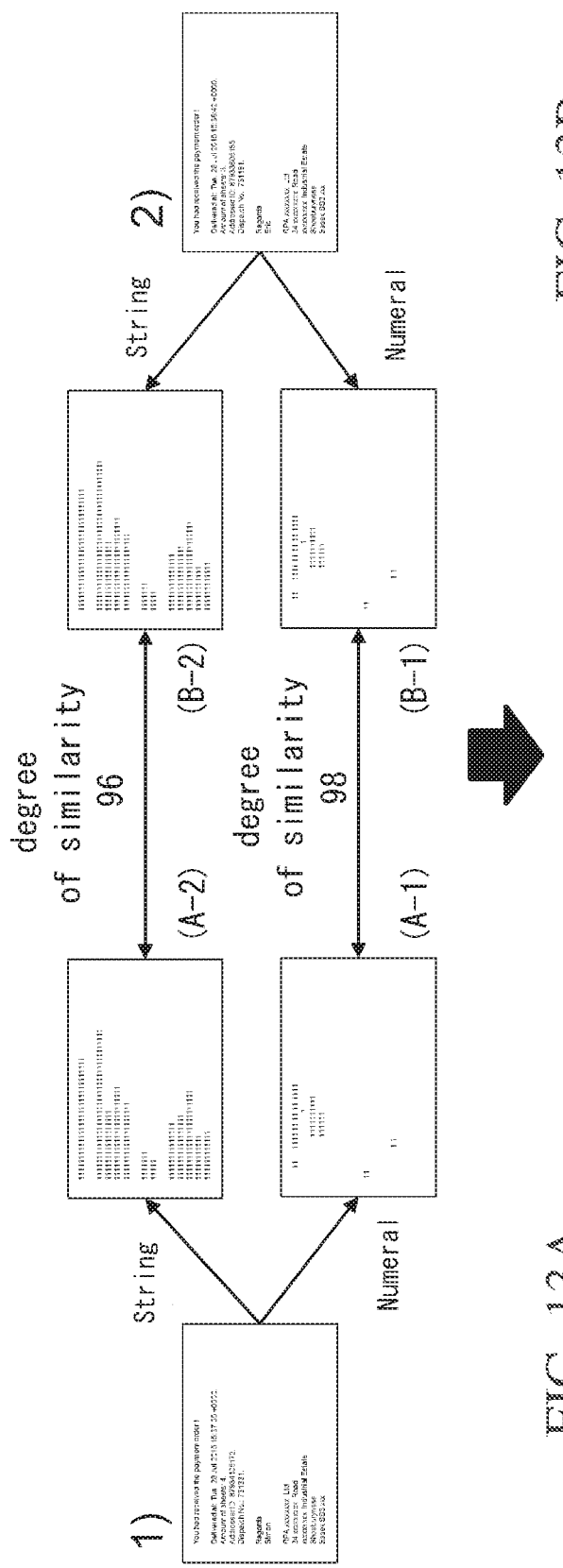

|     | S1  | S2  | S3  | S4  | S5  | S6  | S7  |
|-----|-----|-----|-----|-----|-----|-----|-----|
| S1  | 1   | 0.2 | 0.9 | 0.6 | 0.5 | 0.9 | 0.1 |
| S2  | 0.2 | 1   | 0.2 | 0.9 | 0.5 | 0.5 | 0.6 |
| S3  | 0.9 | 0.2 | 1   | 0.2 | 0.5 | 0.5 | 0.6 |
| S4  | 0.6 | 0.9 | 0.2 | 1   | 0.7 | 0.5 | 0.6 |
| S5  | 0.5 | 0.5 | 0.5 | 0.7 | 1   | 0.5 | 0.9 |
| S6  | 0.9 | 0.5 | 0.5 | 0.5 | 0.5 | 1   | 0.2 |
| S7  | 0.1 | 0.6 | 0.6 | 0.6 | 0.9 | 0.2 | 1   |

DOCUMENT STRUCTURE ANALYSIS DEVICE WITH IMAGE PROCESSING

CROSS-REFERENCE TO RELATED APPLICATIONS

This application is a continuation of International Application No. PCT/JP2015/085603, filed on Dec. 21, 2015, which claims priority to Japanese Application No. 2015-234408, filed on Dec. 1, 2015, both of which are hereby incorporated herein by reference.

TECHNICAL FIELD

The present invention relates to a document structure analysis device using an image processing.

BACKGROUND

As a method for eliminating spam mail, a mail server for distributing e-mails to recipients stores determination information, for example, keyword, address of a sender, URL etc., for judging whether or not it is spam mail and then the received e-mail is classified into spam mail to discard and not to deliver it to an user if the received e-mail include the determination information. Also, a user can set a filter rule by oneself into a user's terminal to filer e-mails including a specific address or keyword as a spam mail.

For example, Japanese patent No. 5121828 (corresponding to U.S. Patent Pub. No. 2010/161748) discloses an e-mail processing apparatus. According to this patent, the e-mail processing apparatus extracts appearance information (for example, the number of e-mail lines, attached file, e-mail format, and language in e-mail etc.) as outline information indicating appearance features of e-mail excepting for a body of e-mail, a sender and its address, and a recipient and its address, requests an external management center to send spam detection information for detecting spam mail based on the extracted outline information, decides that the e-mail is spam mail if content of the e-mail matches spam detection information, and requests the external management center to send updated spam detection information by sending the outline information if the e-mail is not decided to be spam mail.

Also, Japanese patent publication No. 2011-90442 disclosed is an e-mail classification apparatus for reducing a processing load for eliminating spam mails and manipulation load by users. According to this publication, the e-mail classification apparatus retrieves a feature vector indicating a feature of e-mail based on header information of the e-mail to create a classification rule for classifying whether or not it is spam mail using the feature vector as learning data.

The conventional methods for detecting and classifying spam mail have been studied, however, contents of spam mails are changed from day to day and they are sent from unspecified terminals connected to networks in large quantity and indiscriminately, thus it is difficult to exclude such spam mails completely and in real time. On the other hand, to improve accuracy of detection and classification of spam mail, it is required to update the determination information quickly by processing lots of spam mails to extract the determination information for judging spam mail from them. Therefore, a method for extracting the determination information for judging spam mail speedy and accurately is desired. Furthermore, it is also desired to retrieve information concerning spam mail sender resource to utilize it for the determination information.

SUMMARY

The present invention relates to a document structure analysis device using an image processing of data such as e-mail, document data, etc. Particular embodiments relate to a method for judging whether or not e-mail is a spam mail (junk mail) etc.

Embodiments of the present invention provide a document structure analysis device for performing a comparison process of sample data simply, accurately and rapidly.

In embodiments of the present invention, a document structure analysis device comprises retrieving means for retrieving sample data in which letter strings and so on are described, signalizing means for converting the retrieved sample data into n-value (n is a natural number greater than or equal to 2), storing means for storing the n-value sample data converted by the signalizing means, calculating means for calculating a degree of similarity by comparing the n-value sample data stored in the storing means with an n-value input data, and classifying means for classifying the input data based on the calculated degree of similarity.

In some embodiments, the signalizing means converts the retrieved sample data into n-dimension and then converts the n-dimension sample data into n-value.

In some embodiments, the signalizing means converts the retrieved sample data in n-value and then converts the n-value sample data into n-dimension.

In some embodiments, the calculating means calculates the degree of similarity of the n-value data of same dimension.

In some embodiments, the signalizing means digitalizes areas where characters etc. are described and blank areas where the characters etc. are not described.

In some embodiments, the signalizing means converts areas where characteristic expressions are described and the other areas into different data value respectively.

In some embodiments, the signalizing means converts the sample data into n-dimension based on an attribution of character etc.

In some embodiments, the signalizing means divides the sample data into n-dimension in accordance with a predetermined rule.

In some embodiments, the signalizing means divides the sample data into n-dimension based on outline features of the sample data.

In some embodiments, the signalizing means divides the sample data into n-dimension based on kinds of characters.

In some embodiments, the signalizing means divides the sample data into n-dimension based on arrangements of characters.

In some embodiments, the signalizing means divides the sample data into n-dimension based on signature regions.

In some embodiments, the input data is an e-mail and the classifying means classifies the e-mail into a spam mail.

In some embodiments, the classifying means classifies the input data into a common document structure of the sample data.

In some embodiments, the document structure analysis device further comprising means for clustering the n-value sample data stored in the storing means.

In some embodiments, the means for clustering calculates a degree of similarity of data and clusters by comparing the calculated degree of similarity with a predetermined threshold.

According to the present invention, comparing n-value sample data with n-value input data and to calculate the degree of similarity between both data makes the judgment of the degree of similarity easy and first compared to the conventional. In particular, in case of comparing the binarized sample data with the binarized input data, data conversion is easy and the high speed processing is achieved because the binary images are compared. Furthermore, conversion of n-dimension of sample data and calculation of the degree of similarity of each dimension allow an improved accuracy of the degree of similarity between the sample data and the input data. Also, expansion and contraction of n-value sample data allows the comparison of different size of spam mails. Furthermore, extracting differences between n-value sample data enables to extract only different parts in structure.

BRIEF DESCRIPTION OF THE DRAWINGS

FIG. 2C shows an example of management table of the sample storage section of the first embodiment.

FIG. 8, collectively FIG. 8A and FIG. 8B, is an example of spam mail with same contents in different languages, FIG. 8A exemplifies in Portuguese and FIG. 8B exemplifies in English.

FIG. 9, collectively

FIG. 10A and FIG. 10B are examples of calculation of the degree of similarity for each dimension.

FIG. 11A and FIG. 11B exemplify document data with few features.

FIG. 12A and FIG. 12B are examples of 2-dimensions*2-valus (binary) of document data in FIG. 11A and FIG. 11B.

FIG. 13A and FIG. 13B are an example of pattern matching of document data shown in FIG. 11A and FIG. 11B.

FIG. 17A and FIG. 17B explain calculation of the degree of similarity and clustering analysis according to the fourth embodiment.

Figure 1A:
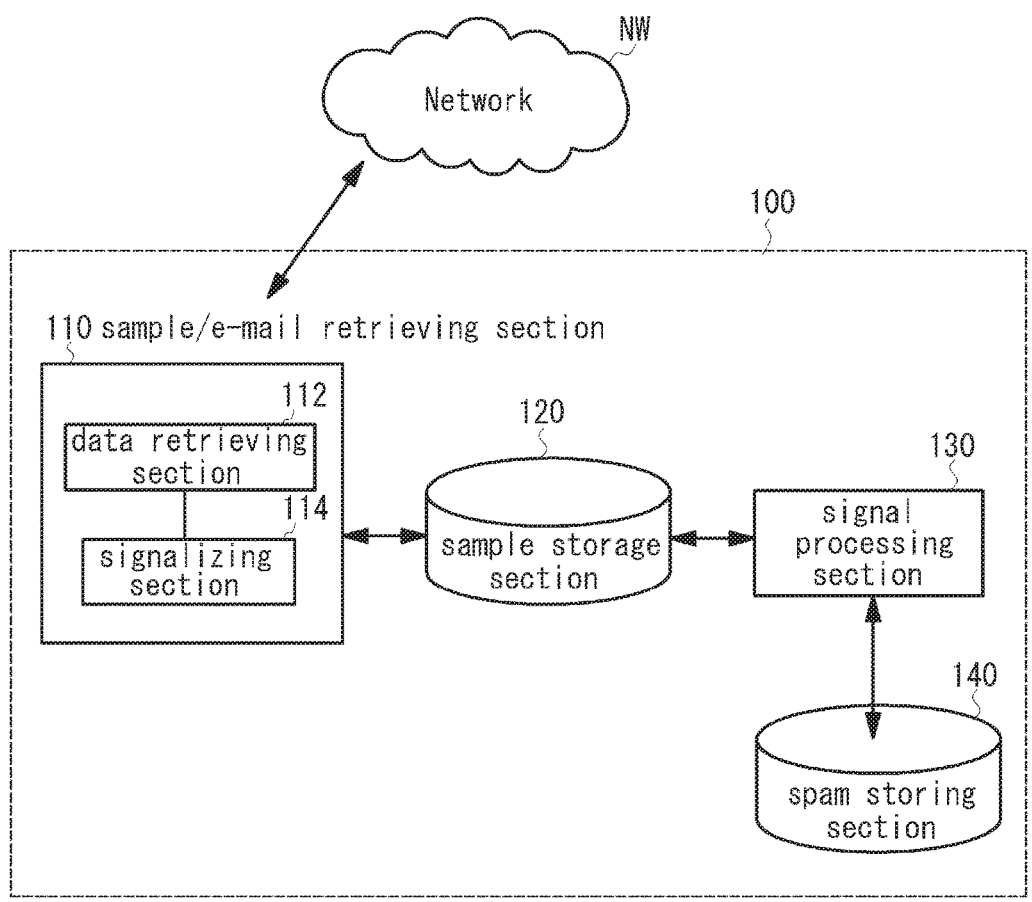
FIG. 1A is a block diagram showing a functional configuration of an mail processing apparatus according to a first embodiment of the present invention.

The following reference numerals can be used in conjunction with the drawings:
- 100: mail processing apparatus
- 110: sample/e-mail retrieving section
- 112: data getting section
- 114: signalizing section
- 120: sample storage section
- 130: signal processing section
- 140: spam storing section
- NW: network

DETAILED DESCRIPTION OF ILLUSTRATIVE EMBODIMENTS

Next, embodiments of the present invention will be described in detail with reference to the drawings. A document structure analysis device using image processing according to a present invention is implemented as a mail processing apparatus in one preferable embodiment. The mail processing apparatus can be connected to a network such as an internet or an intranet etc. to receive an e-mail through the network, and judges whether or not it is spam mail by analyzing the received e-mail. The mail processing apparatus is sufficient to be provided with functions for processing mail and for processing image at least, the email processing apparatus may be provided with other functions implemented by hardware and/or software. The mail processing apparatus, for example, may be a server, a computer, an electronic device, a terminal device, a sever for distributing mail and another electronic device. In addition, expressions "n-value conversion" and "n-dimension conversion" in the embodiments of the present invention are synonymous with multi-value conversion and multi-dimension conversion academically.

FIG. 1A is a block diagram showing a functional configuration of the mail processing apparatus according to a first embodiment of the present invention. The mail processing apparatus 100 includes a sample/e-mail retrieving section no, a sample storage section 120, a signal processing section 130 and a spam mail storing section 140. The mail processing apparatus 100 may be, for example a computer device or an electronic device in which a central processing unit (CPU) executes operations in accordance with programs to achieve a desired function. For example, each function of the sample/e-mail retrieving section no and the signal processing section 130 may be implemented by executing software programs, and each function of the sample storage section 120 and the spam mail storing section 140 may be implemented by utilizing a memory such as RAM/ROM etc.

The sample/e-mail retrieving section no has a data retrieving section 112 for retrieving a sample data or a data of e-mail, and has a signalizing (digitizing) section 114 for signalizing the retrieved data. In one embodiment, the sample/e-mail retrieving section no retrieves a dishonest sample data represented by a spam mail. Namely, by using a honey pot technique, an e-mail sent to an unpublic (unpublished) address is considered a spam mail, thus the spam mail is retrieved as the sample data. The retrieved sample data by this scheme is used for a determination material for judging the spam mail. In another aspect, data of e-mail including a recipient address is retrieved. This e-mail may be a spam mail or not. The sample/e-mail retrieving section no can retrieve data from not only a network NW but also another route. For example, the sample/e-mail retrieving section no may retrieve the sample or data from a storage medium for storing large amounts of document data (a semiconductor memory, a DVD disk, or another computer device).

The signalizing section 114 performs a signalizing (digitizing) process of data retrieved by the data retrieving section 112. First, the signalization of the spam mail (the sample data) collected by the honey pot will be explained. The signalization (digitization) is to convert characters, numerals, symbols and a figure etc. (hereinafter they are referred to characters etc.) of natural-language expressed in data and blank area(s) where such characters etc. are not expressed, into n-value data (n is a natural number greater than or equal to 2). In this embodiment, converting data into binary data is exemplified.

Figures 2A, 2B:
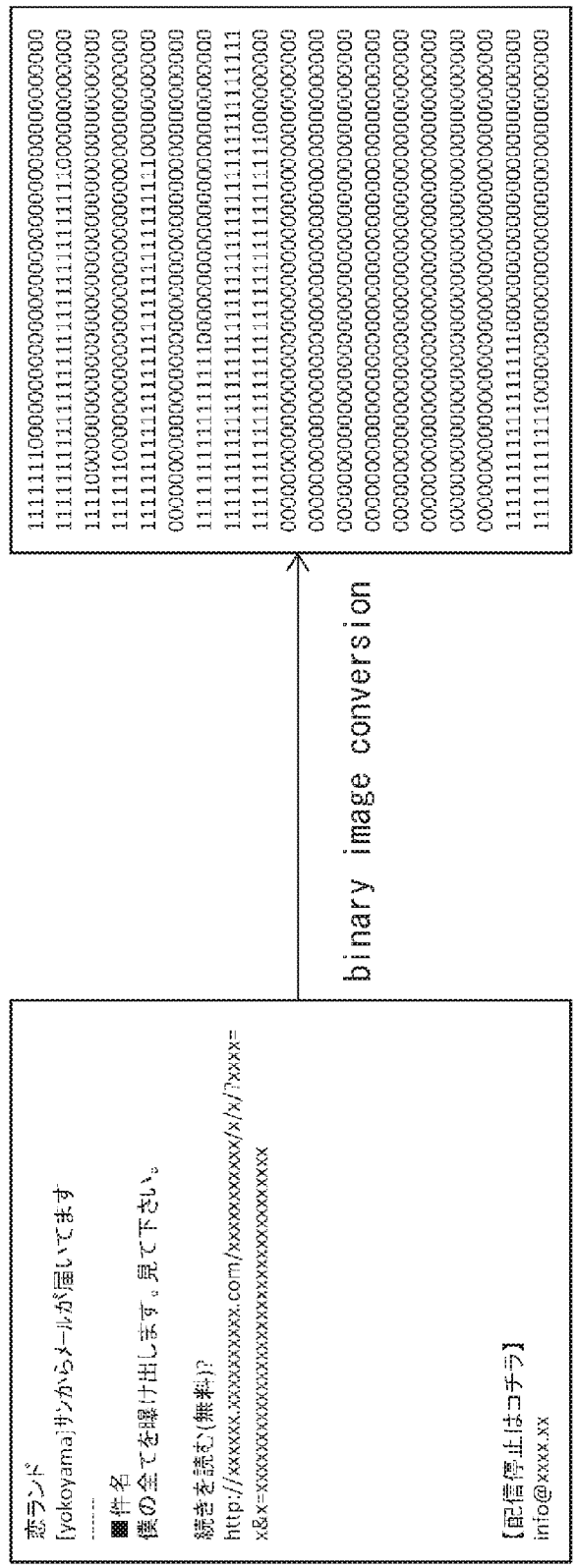
FIG. 2A and FIG. 2B show an example of binarized document data according to the present embodiment.

The signalizing section 114 analyzes a data size from a format etc. of the retrieved data. Specifically, the signalizing section 114 analyzes that one page of data is made of n rows*m columns and then converts the areas with each characters expressed into data "1" respectively and converts the blank areas into data "0" respectively. The data format in n rows*m columns is either a format created by an editor software used by the user sender side or a format defined by a mailer (mail software) at recipient side. Also, the characters etc. is expressed by a code such as 1 byte, 2 bytes or 3 bytes etc. (for example, ASCII or Shift JIS etc.). The areas where such codes exist is converted into data "1" respectively and areas where such codes are not exist is converted into data "0" respectively. If a full-width character or a half-width character can be identified, for example, the areas of the half-width character is expressed by "1", the areas of the full-width character may be signalized "11". FIG. 2A and FIG. 2B show an example of a signalized data by the signalizing section. That is, when the spam mail shown in FIG. 2A is retrieved by the data retrieving section 112, the signalizing section 114 converts the spam mail into binary image as shown in FIG. 2B. The binary image data is stored in the sample storage section 120.

The sample storage section 120 stores the sample data (spam mail) signalized by the signalizing section 114 successively. The sample storage section 120 includes, for example, a management table for managing the sample data as shown in FIG. 2C. The management table includes identification information for identifying each sample data, as attribute information with format information (contains n rows*m columns), date information of signalization, and storage address of sample data and signalized data etc.

The signal processing section 130 may perform a various signal processing based on the binary data stored in the sample storage section 120. In this embodiment, the signal processing section 130 compares the binary data of the e-mail, which is received as an input data, with the binary data stored in the sample storage section 120 to judge whether or not the e-mail is spam. In a modified embodiment described later, the signal processing section 130 extracts the sample data which is similar to the inputted e-mail data. The e-mail as the spam judged by the signal processing section 130 is stored in the spam mail storing section 140.

Figure 3A:
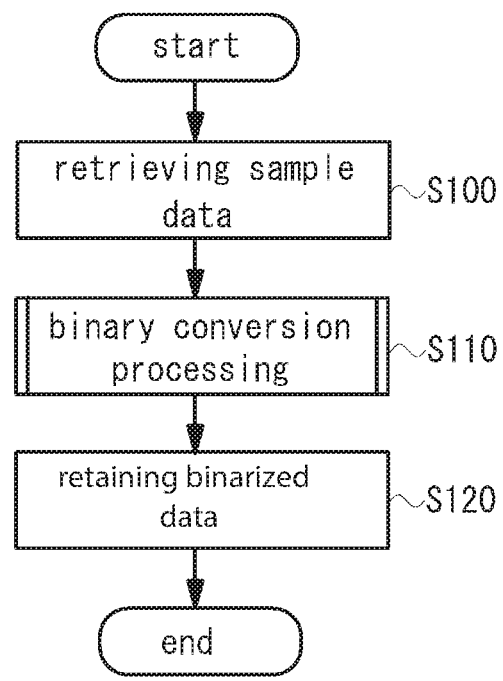
FIG. 3A is a flow chart for explaining operations of sample/e-mail retrieving section of the first embodiment.

Next, detail operations of the mail processing apparatus in the embodiment will be explained. FIG. 3A is a flow chart for explaining operations of the sample/e-mail retrieving section 110. The data retrieving section 112 identifies that the retrieved data is a sample data or an e-mail (S100). In one method, for example, the e-mail received at nonpublic address is identified as the sample data and the e-mail received at other address is identified as non-sample data. As another method, a dedicated terminal for receiving the sample data and a dedicated terminal for receiving the e-mail may be prepared to judge the sample data or the e-mail by identifying terminal. Other methods than the above may be employed.

Figure 3B:
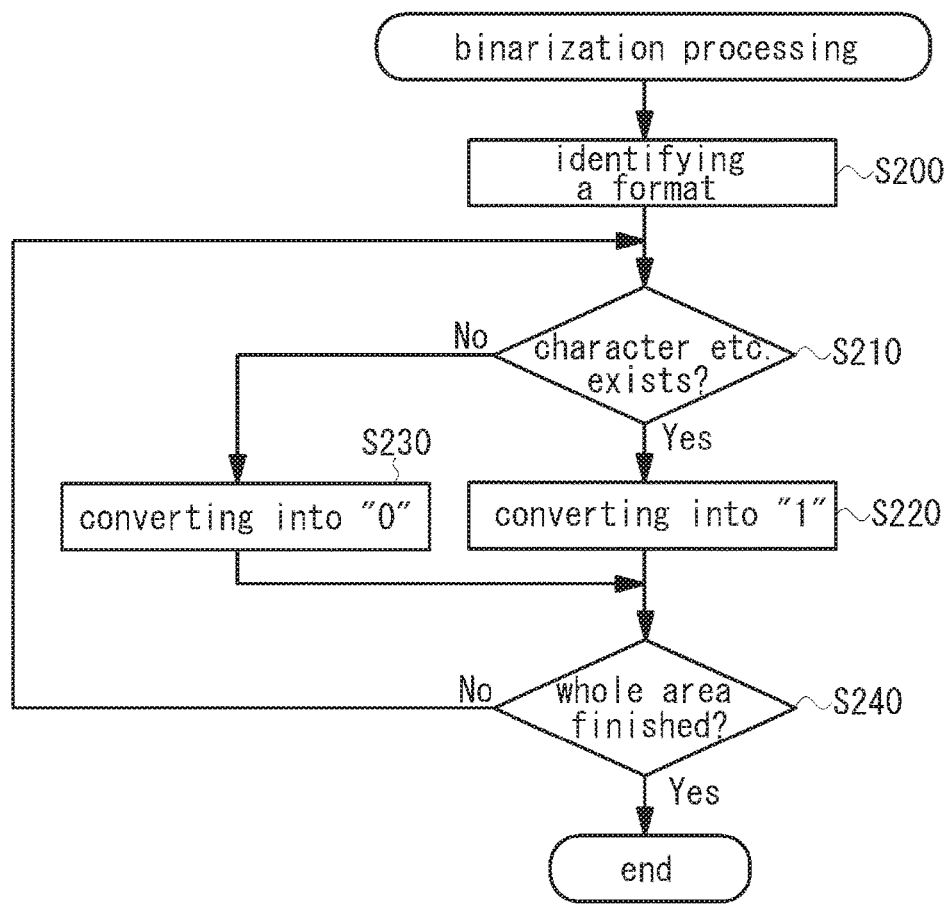
FIG. 3B is a flow chart for explaining operations of binarization process of the first embodiment.

The data retrieving section 112 provides the sample data to the signalizing section 114 upon the reception of the sample data. The signalizing section 114 binarizes the retrieved sample data (S110) and stores the binarized sample data in the sample storage section 120 (S120). The management data as shown in FIG. 2C is created and/or updated when the sample data is stored. The binarized sample data is accumulated in the sample storage section 120 by performing such processes FIG. 3B is a flow chart for explaining the binarization process (corresponds to S110) of the signalizing section 114. The signalizing section 114 identifies format information of the retrieved sample data, namely, identifies a page size (n rows*m columns) of the sample data (S200). Next, the signalizing section 114 identifies areas where the characters etc. expressed in the sample data are existed and blank areas (S210), and converts the code into data "1" if the code expressing the characters etc. are existed (S220), and converts the code into data "0" if the codes are not existed (S230). Such binarization process is performed in the whole range of n rows*m columns defined by the page size (S240). For example, the areas where the characters etc. of the sample data are described is converted data "1" and the blank areas where the characters etc. are not described is converted into data "0", by the binarization process, as shown in FIG. 2A and FIG. 2B.

Figure 4:
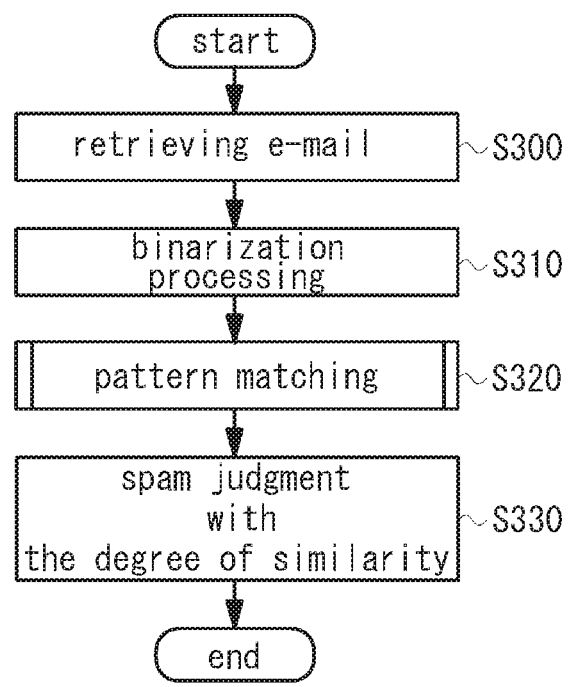
FIG. 4 is a flow chart for explaining operations of signal processing section according to the first embodiment.

FIG. 4 is a flow chart for explaining operations of the signal processing section 130 according to this embodiment. As described above, the data retrieving section 112 identifies the sample data or the e-mail. In response to the identification results, when the e-mail is retrieved (S300), the e-mail is binarized by the signalizing section 114 as well as the sample data (S310). The binarized e-mail Tx by the signalizing section 114 is inputted to the signal processing section 130. The signal processing section 130 compares the binarized e-mail Tx with the binarized sample data stored in the spam storage section 120 by means of pattern matching (S320) to judge whether or not the e-mail is the spam mail based on the degree of similarity between the both (S330).

Figure 5A:
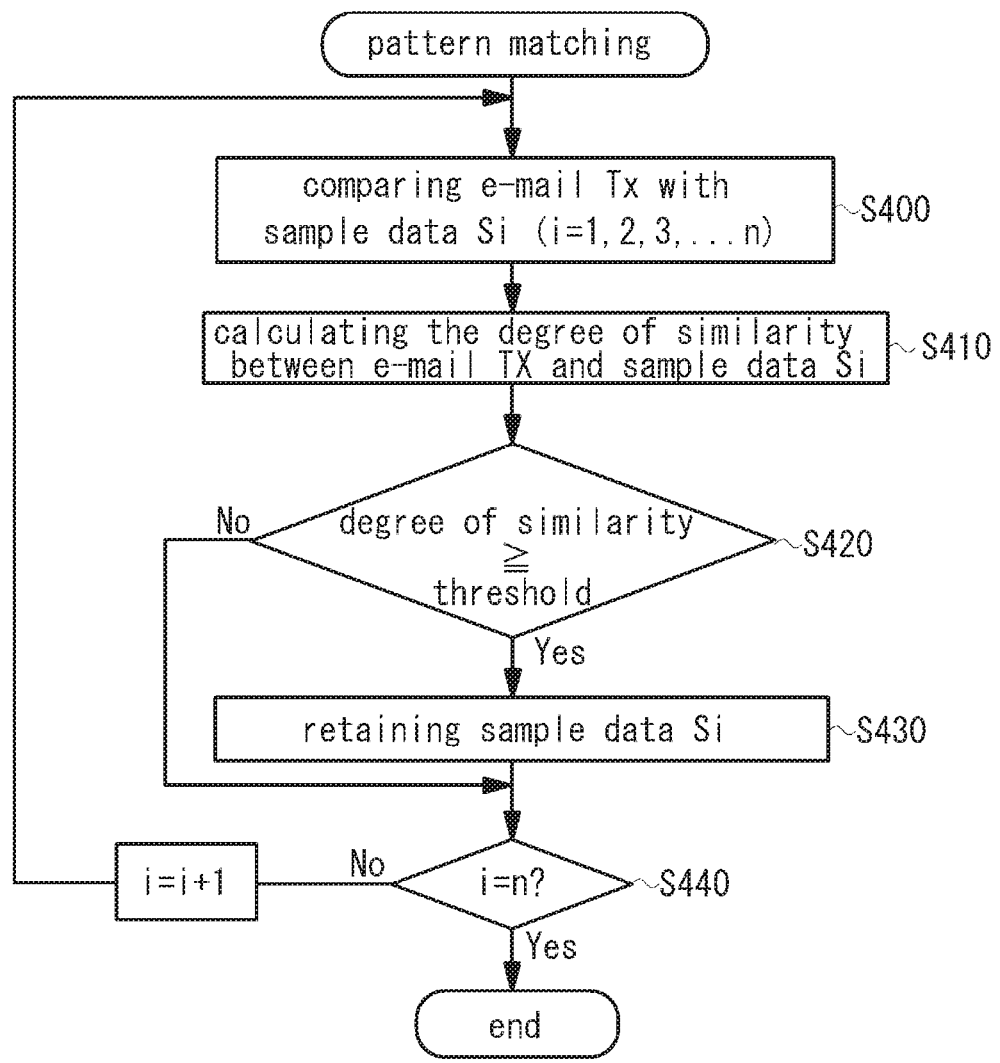
FIG. 5A is a flow chart for explaining details of the pattern matching of FIG. 4.

FIG. 5A is a flow chart for explaining details of the pattern matching (corresponds to S320). The signal processing section 130 compares the binarized e-mail Tx with the binarized sample data S1 (i=1, 2, 3 . . . n, and n is the number of sample data) readout from the sample storage section 120 (S400), and calculates the degree of similarity between the e-mail TX and the sample data S1 (S410). Here, if the page size of the e-mail Tx is different from that of the sample data S1, normalization of any of the binarized data is performed so as to match the both page sizes. While the calculation method of the degree of similarity is not limited particularly, for example, the overlap areas of data "1" or data "0" may be calculated. Next, the signal processing section 130 judges whether or not the degree of similarity is greater than or equal to a threshold (S420), and retains the sample data S1 which is greater than or equal to the threshold (S430). The threshold may be determined arbitrarily, as the threshold is higher, the hit ratio of the sample data is lower, while the higher accuracy of judgement of spam mail is achieved. Contrarily as the threshold is lower, the hit ratio of the sample data is higher, while the accuracy of judgement of spam mail is degraded at once. The signal processing section 130 compares the e-mail with all of the sample data, in other words, compares until i=n (S440).

The signal processing section 130 determines whether or not the e-mail is the spam mail based on the results of the pattern matching. While the determination method is arbitrary, for example, the e-mail is judged as the spam mail if one sample data is greater than or equal to the threshold by establishing the high threshold, or the e-mail is judged as the spam mail if the predetermined numbers of the sample data are greater than or equal to the threshold by establishing the relatively low threshold.

According to this embodiment, the rapid spam judgement is achieved without using complex algorithm etc. because the sample data and the e-mail are converted into n-value respectively and the spam mail is judged due to the degree of similarity for the both data of n-value. Particularly, if the sample data and the e-mail are binarized respectively, it makes the signalization of data easy and enables to judge the similarity of the binarized image in high speed.

Figure 5B:
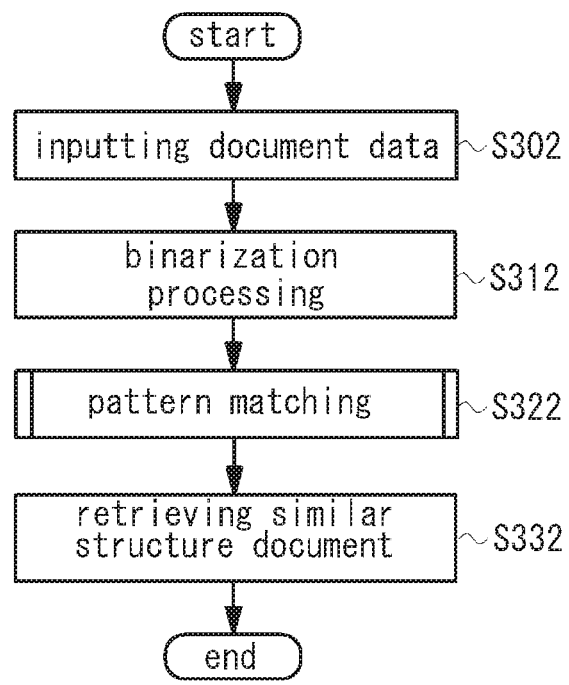
FIG. 5B is a flow chart for explaining operations of signal processing section according to a modification of the first embodiment of the present invention.

Next, a modification according to the first embodiment of the present invention will be explained. In the above embodiment, the judgement for whether or not the e-mail is the spam mail has been exemplified. In the modification, the extraction of structure document, which is similar to the inputted document data, will be exemplified. FIG. 5B is a flow chart of this modification. The sample/e-mail retrieving section no retrieves an input document data (S302), the signalizing section 114 binarizes the retrieved document data (S312), and the binarized document data is provided with the signal processing section 130.

The signal processing section 130 compares the binarized document data with the binarized sample data readout from the spam storage section 120 by means of pattern matching (S322). In the modification, the sample data stored in the sample storage section 120 is not necessarily limited to the spam mails or dishonest documents data, but may be sample data with various document structures. The pattern matching may be performed as well as the method shown in FIG. 5A.

The signal processing section 130 retrieves the sample data whose document structure is similar to the inputted document data, based on the result of the pattern matching (S332). As shown in FIG. 5A, based on the result that the sample data with greater than or equal to the threshold is retained, the signal processing section 130 refers the management table in FIG. 2C to output the sample data before the binarization or stores it in the storing section. According to this, the user recognizes the sample data whose the document structure is similar to the inputted document data.

Figure 6:
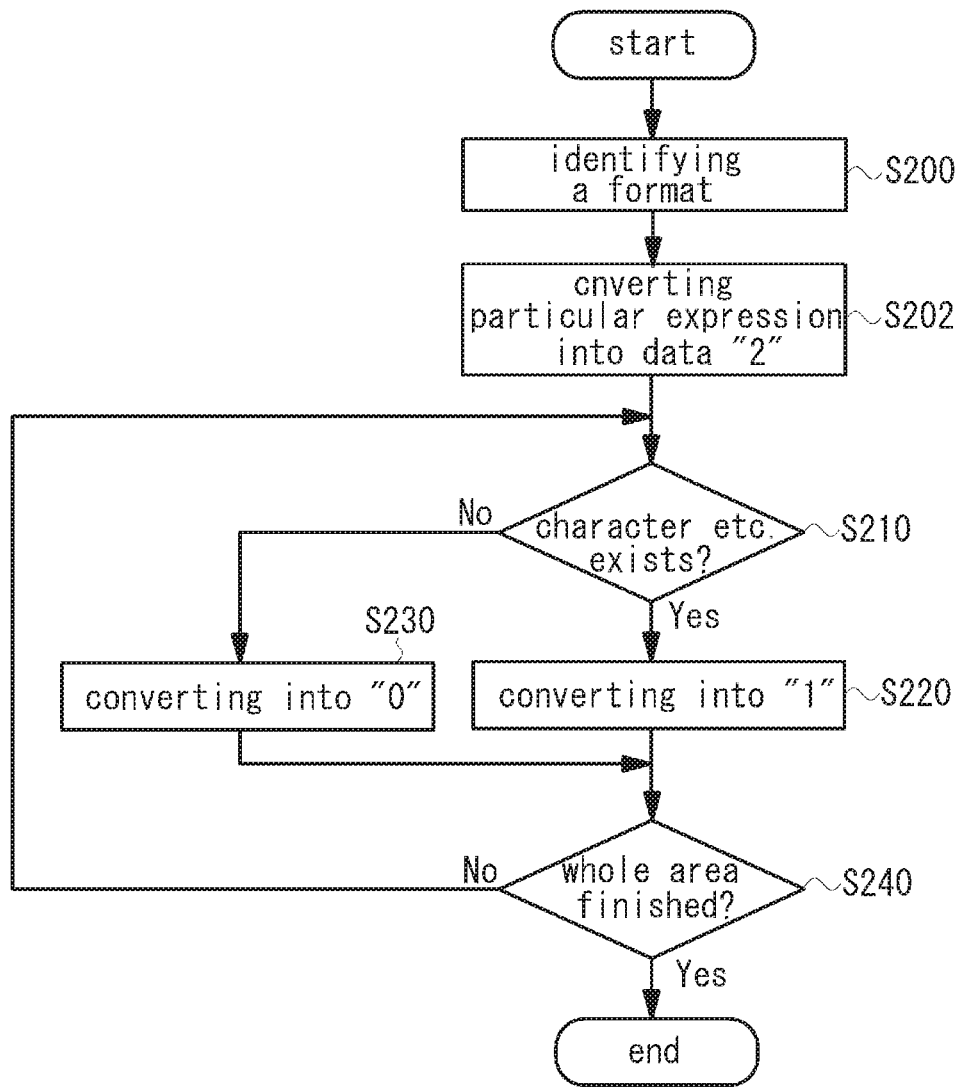
FIG. 6 is a flow chart for explaining operations of the signalizing section according to a modification of the first embodiment of the present invention.

Furthermore, as another modification according to the first embodiment, the signalizing section 114 can convert the sample data and the e-mail into multi-value such as 3-value conversion and 4-value conversion other than the binarization of the sample data and e-mail. Furthermore, weighting or filtering of data can be implemented by performing the multi value conversion of the sample data etc. FIG. 6 is a flow chart for explaining operations in case the sample data is converted into 3-value. The signalizing section 114 identifies the format of the retrieved sample data (S200) and converts characteristic expressions including such as keyword, specific expression, URL, mail address, special symbol or mark, telephone number and letter string with ordinality into data "2" before each one character is signalized (S202). These characteristic expressions are recognized as letter strings, thus this process is performed before every characters are signalized. Next, each characters etc. expressed in the sample data is identified (S210), the characters etc. excepting characters already converted into data "2" (other than the characteristic expressions) is converted into data "1". By such processing, the sample data is converted into 3-value with data "0", "1" and "2". The sample data converted into 3-value is stored in the sample storage section 120. Also, understandably, the e-mail and the document data are converted into 3-value in case that the determination of the spam mail or the extraction of the similar document structure is performed by using the sample data with such 3-value.

Figure 1B:
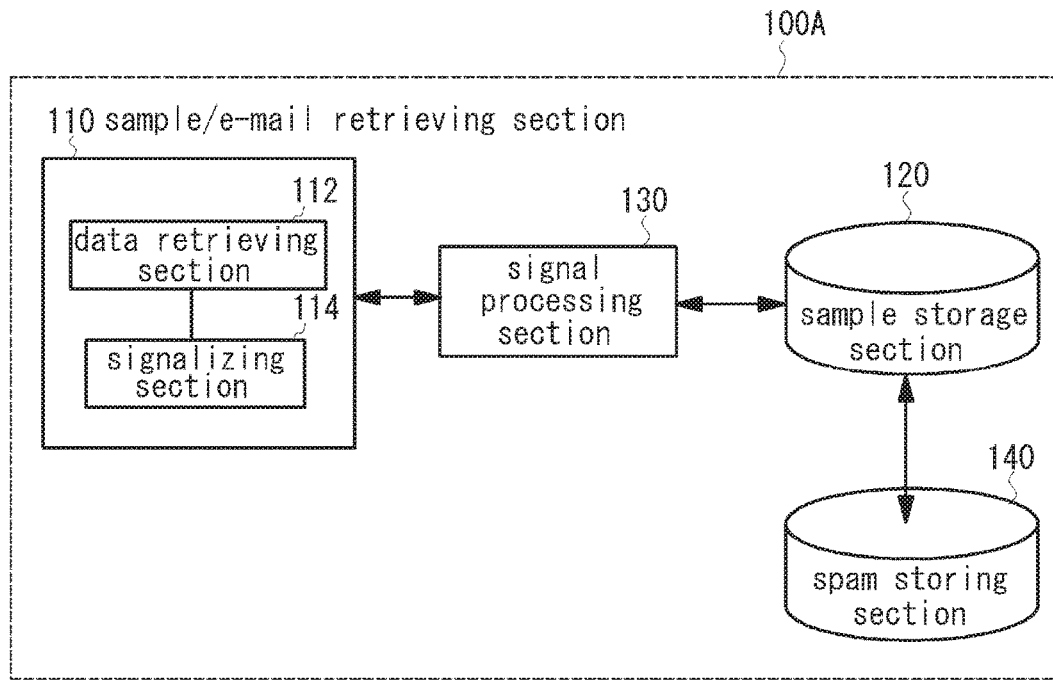
FIG. 1B and FIG. 1C show a modification of the mail processing apparatus according to the first embodiment of the present invention.
Figure 1C:
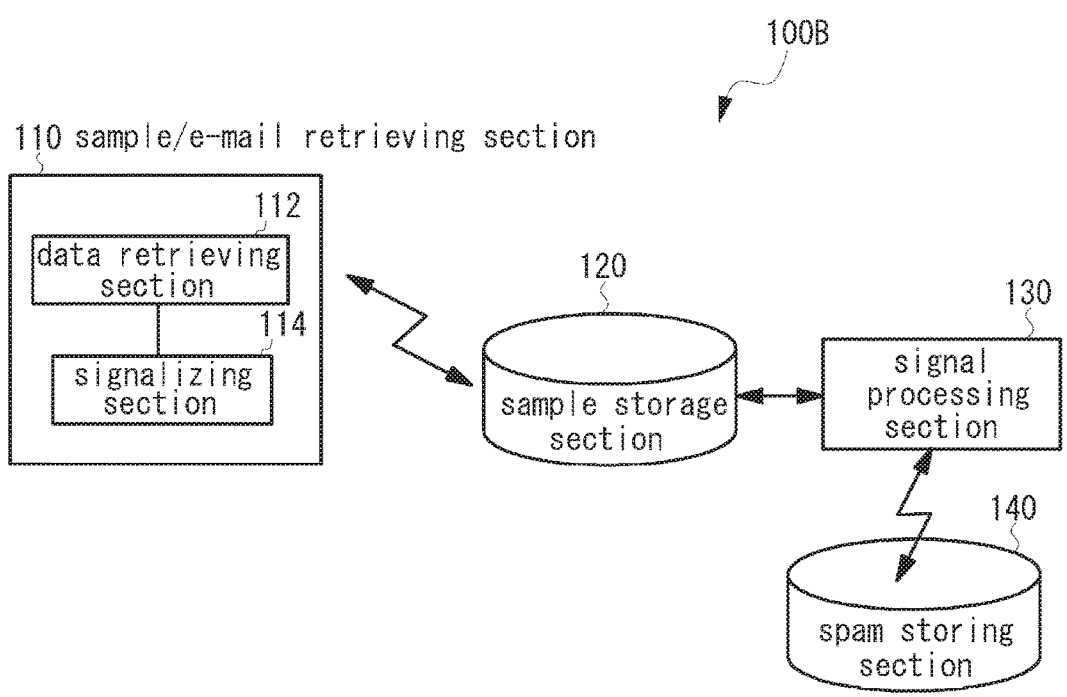

In addition, the mail processing apparatus 100 is not limited to the configuration shown in FIG. 1A, but may be modified to another aspects. For example, as shown in FIG. 1B, the mail processing apparatus 100 may be configured such that the sample storage section 120 and the signal processing section 130 are counterchanged. In this case, the signal processing section 130 may begin the signal processing in response that the e-mail is retrieved by the e-mail retrieving section no. Although the mail processing apparatus 100 in FIG. 1A incorporating the sample/e-mail retrieving section no, the sample storage section 120, the signal processing section 130 and the spam storing section 140 integrally is exemplified, the mail processing apparatus 100 does not need to incorporate each functions integrally and physically if the same functions are practicable, and it may be configured so that each functions are coupled organically. For example, as shown in FIG. 1C, the mail processing apparatus 100B is configured to include a gate way, a data center and a sever etc. connected by networks. In other words, the sample/e-mail retrieving section no may be connected to the sample storage section 120 and the signal processing section 130 through the networks, and the signal processing section 130 may be connected to the spam storing section 140 by the networks.

Figure 7A:
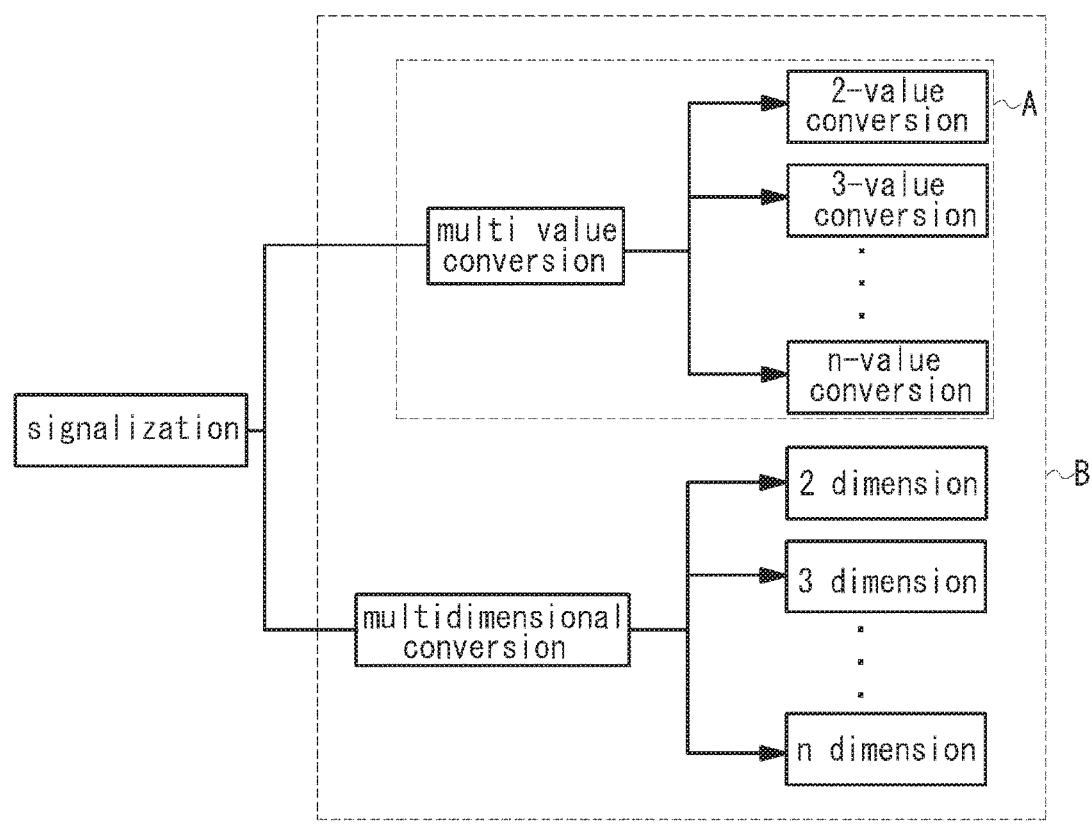
FIG. 7A explains operations of the signalizing section according to a second embodiment of the present invention.

Next, a second embodiment according to the present invention will be explained in detail in reference to the drawings. The first embodiment exemplifies that one document is signalized by means of conversion of n-value to judge the spam mail. In the second embodiment, one document is divided into n-dimension data and n-value conversion for each same dimension is performed. FIG. 7A explains the signalization according to the second embodiment. The first embodiment converts the data into n-value to enable the hierarchical weighting of data, as shown in A. While the second embodiment classifies the data into a plurality of dimensions to enable the n-value conversion for the classified data, as shown in B (n is a natural number greater than or equal to 2). In addition, the equivalent or similar configurations and functions etc. of the mail processing apparatus 100 of the first embodiment is applied with the second embodiment unless otherwise noted.

Figure 7B:
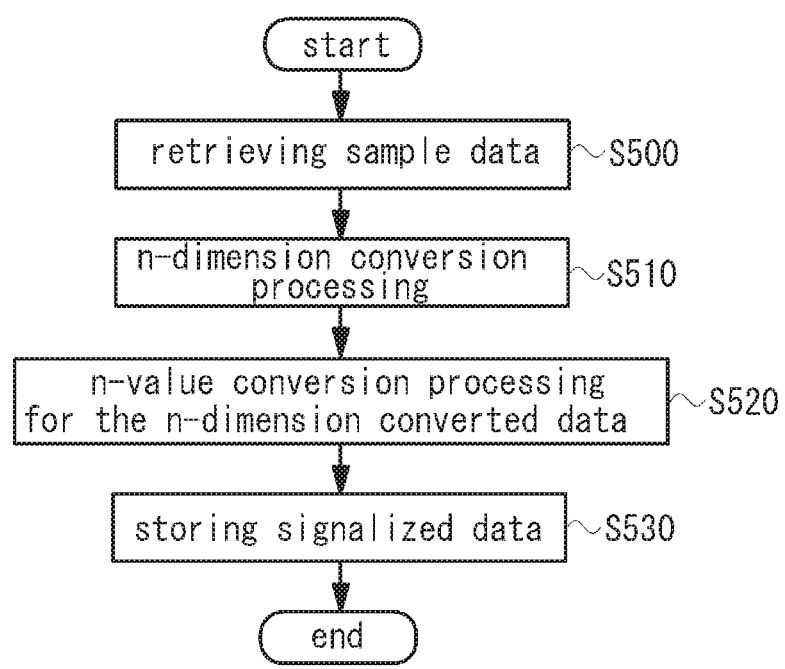
FIG. 7B is a flow chart for explaining operations of the sample/e-mail retrieving section according to the second embodiment of the present invention.

FIG. 7B is a flow chart for explaining operations of the sample/e-mail retrieving section no according to the second embodiment. Hereinafter, an example of converting the sample data into n-dimension and converting n-value for n-dimensioned data is described. The sample data is retrieved by the data retrieving section 112 (S500), then the signalizing section 114 converts the sample data into n-dimension in accordance with a predetermined rule (S510). The predetermined rule is, as one example, that the sample data is classified into n-dimension from its appearance features. For example, the data is classified into n-dimension based on type (font or style) and/or arrangement of the characters etc. expressed in the data, or the data is classified into n-dimension based on areas such as header part (header sentences showing business corporation information etc. of HTML mail), footer part, mail sender part (for example descriptions of signatures etc in the mail body or sentence), mail recipient part (for example such as business cooperation, address described in the beginning of the mail body) and signature part etc. Next, the signalizing section 114 converts the respective n-dimensioned data into n-value as well as the first embodiment (S520). By such processing, the signalized data is stored in the sample storage section 120 (S530).

Figure 7C:
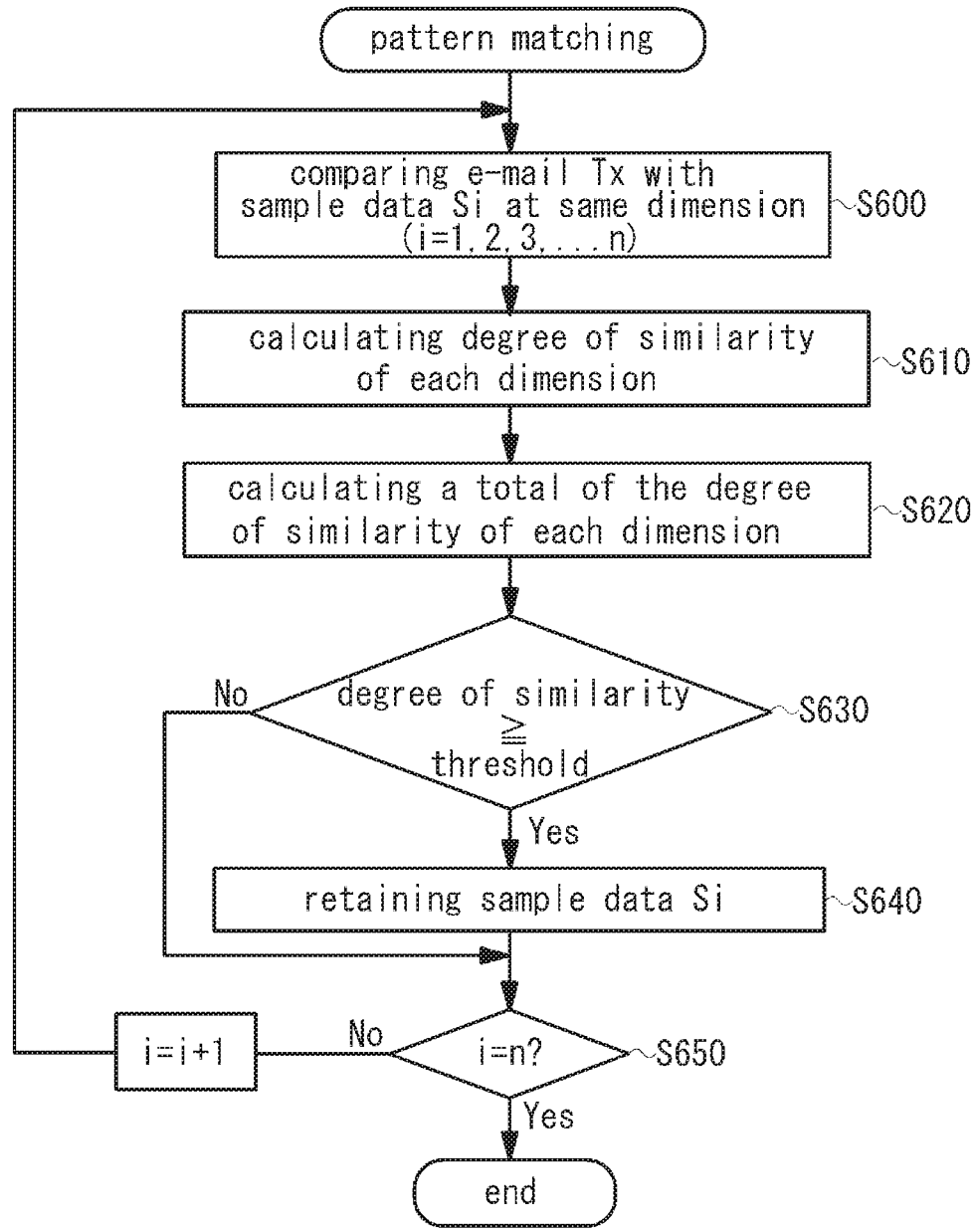
FIG. 7C is a flow chart for explaining a pattern matching of the signal processing section according to the second embodiment of the present invention.

FIG. 7C is a flow chart for explaining pattern matching between the sample data and the e-mail according to the second embodiment. After the e-mail is retrieved by the data retrieving section 112, the e-mail is processed by the signalizing section 114 so that it is converted into n-dimension*n-value, and the processed data is provided with the signal processing section 130. The signal processing section 130 compares the e-mail Tx with the sample data S1 readout from the sample storage section 120. It should be noted that the same dimensioned data is compared in the pattern matching (S600). Next, the signal processing section 130 calculates the degree of similarity of each dimension (S610), and then calculates the total of the degree of similarity of each dimension (S620). Then, the total amount of the degree of similarity or an average of the degree of similarity is judged whether or not it is greater than or equal to the threshold, the sample data is retained if it is greater than or equal to the threshold (S630). The e-mail is compared with every sample data, as the result only the sample data with the degree of similarity greater than or equal to the threshold is retained.

According to the second embodiment, by converting the data into n-dimension, the features unevenly distributed in data can be extracted and the mutual extracted features can be compared. Also, the degree of similarity of each dimension is summed as it is in the embodiment above, while the each dimension may be weighted. For example, the degree of similarity concerning the header part of sample data may be heavily weighted than the other parts. As a result, the features unevenly distributed in data are reflected greatly to the determination of the degree of similarity, whereby the judgment of spam mail or the extraction of the similar document structure can be performed accurately.

Figures 9A, 9B:
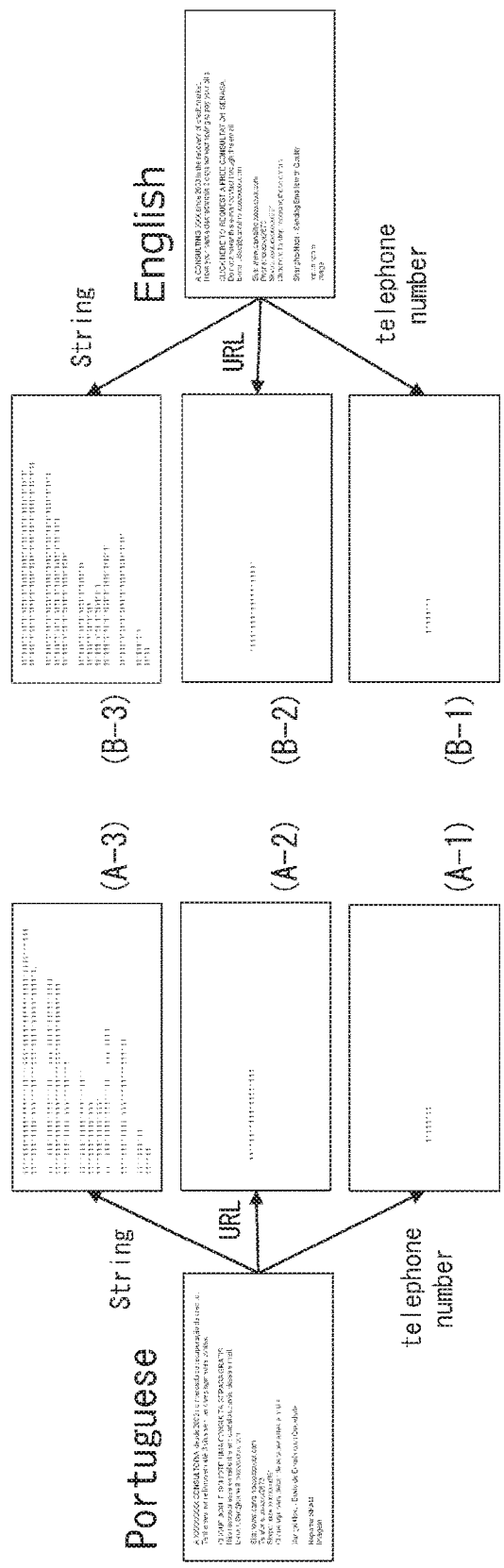
FIG. 9A and FIG. 9B, is examples of 3-dimensions*2-value (binarization) of spam mail in FIG. 8A and FIG. 8B.

Next, a specific example of judgment of the spam mail according to the second embodiment will be explained. FIG. 8A and FIG. 8B show the same contents, however these spam mails described in different language (Portuguese and English). In this case, filtering the contents is not effective probably. FIG. 9A shows that the spam mail in Portuguese of FIG. 8A is converted into 3-dimension*2-value, and FIG. 9B shows that the spam mail in English of FIG. 8B is converted into 3-dimension*2-value. Assuming that the spam mail in Portuguese is the sample data and the spam mail in English is the inputted e-mail.

The signalizing section 114 classifies the sample data into three dimensions comprised of a dimension which letter strings are described (A-1), a dimension which URL is described (A-2) and a dimension which a telephone number is described (A-3), in accordance with the predetermined rule, and binarizes each dimensioned data. The classification into each dimension may be implemented by attributes of data expressed there or by the areas if the areas describing letter strings, URL and telephone number are identified. For the dimension (A-1) the areas are binarized so that the areas where the letter strings are expressed is converted into data "i" respectively and the blank areas are converted into data "0" respectively. For the dimension (A-2), the areas are binarized so that the areas where URL is expressed is converted into data "1" respectively and the other blank areas are converted into data "0" respectively. For the dimension (A-3) the areas are binarized so that the areas where the telephone number is expressed is converted into data "i" respectively and the other blank areas are converted into data "0" respectively. It should be noted that data "0" is omitted in the drawings. The sample data signalized such this process is stored in the sample storage section 120. On the other hand, when the e-mail is retrieved, the signalizing section 114 classifies the e-mail into 3-dimension comprised of a dimension where letter strings are described (B-1), a dimension where URL is described (B-2) and a dimension where a telephone number is described (B-3), and binarizes each dimensioned data. And then, the signal processing section 130 compares the e-mail with the sample data to judge the spam.

FIG. 10, collectively FIG. A and FIG. 10B, exemplifies the pattern matching. In the pattern matching, the binarized images with same dimensions are compared. That is, the degree of similarity between the dimension (A-1) of the sample data and the dimension (B-1) of the e-mail (B-1) is calculated. Similarly, respective degree of similarity between the dimensions (A-2) and (B-2), and between the dimensions (A-3) and (B-3) are calculated. In this example, the degree of similarity of the dimension between (A-1) and (B-1) is 80, the degree of similarity of the dimension between (A-2) and (B-2) is 98 and the degree of similarity of the dimension between (A-3) and (B-3) is 100. Since the average 92.6 exceeds the threshold 90, the e-mail is judged as the spam mail.

Thus, it is advantageous in judging the spam mails with different languages and different document structures because the data is classified into multiple dimensions and each degree of similarity for each dimension is calculated. Sometime the spam mail in which the only language is changed without mostly changing structures of URL and telephone number is delivered. The accuracy of judgement may be degraded because of differences of the document structures in the simplified comparison of images as the first embodiment. Actually, the degree of similarity of the dimension of "letter strings" in FIG. 10A and FIG. 10B is lower than other dimensions relatively, which is lower than the threshold 90. In the second embodiment, comparing the degree of similarity of the characteristic dimension of the spam mail causes the improved accuracy of judgement for the spam mail.

The spam mail in FIG. 8A and FIG. 8B includes lots of feature such as URL and telephone number etc., so the judgement of the spam mail is relatively easy. However the judgement of the spam mail is difficult if the mail has the structure of few features such as URL and telephone number etc. The spam mail that has few features is the mail that changes numerals slightly in the body to avoid the extraction of features well. FIG. 11A and FIG. 11B show an example of document data with few features. FIG. 11A is a sample data stored in the sample storage section 120 and FIG. 11B is an example slightly changing numerals etc. in the sample data of FIG. 11A.

FIG. 12A and FIG. 12B show 2-dimensioned and binarized FIG. 11A and FIG. 11B. Namely, it is classified into the dimension of letter string (A-1) and (B-1) and the dimension of numeral (A-2) and (B-2). The classification of the numeral and letter string may be implemented by attributes of data or may be classified by areas if the areas where the numerals and the strings are described can be identified. Assuming that the document data in FIG. 11A is the sample data and the document data in FIG. 11B is the e-mail. FIG. 13A and FIG. 13B show the result of the pattern matching of both data. The degree of similarity between the dimension (A-1) and (B-1) signalized by the dimension of "numeral" and the degree of similarity between (A-2) and (B-2) signalized by the dimension of "letter string" are calculated respectively, and the average of these degree of similarity is calculated by dividing the total amount of the degree of similarity of each dimension by the number of dimension. The signal processing section 130 judges the e-mail as the spam mail if the degree of similarity of the average exceeds the threshold. Since the average of the degree of similarity for the dimensions is 97 which is exceeds the threshold 90 in the example of FIG. 13A and FIG. 13B, the e-mail shown in FIG. 11B is judged as the spam mail. Thus, the spam mail with few features such as URL and telephone number etc. can be also judged.

Next, a third embodiment according to the present invention will be explained. The second embodiment converts the sample data etc. into n-dimension and converts the n-dimensioned data into n-value, on the other hand, the third embodiment converts the data into n-value, divides the areas of data based on the n-value, extracts characteristic expressions from the divided data, and judges the spam mail and the similar structure document by using the characteristic expressions. In other words, the third embodiment converts the data into n-value and converts the n-value data into n-dimension, whose order is opposite that of the second embodiment.

Figure 14:
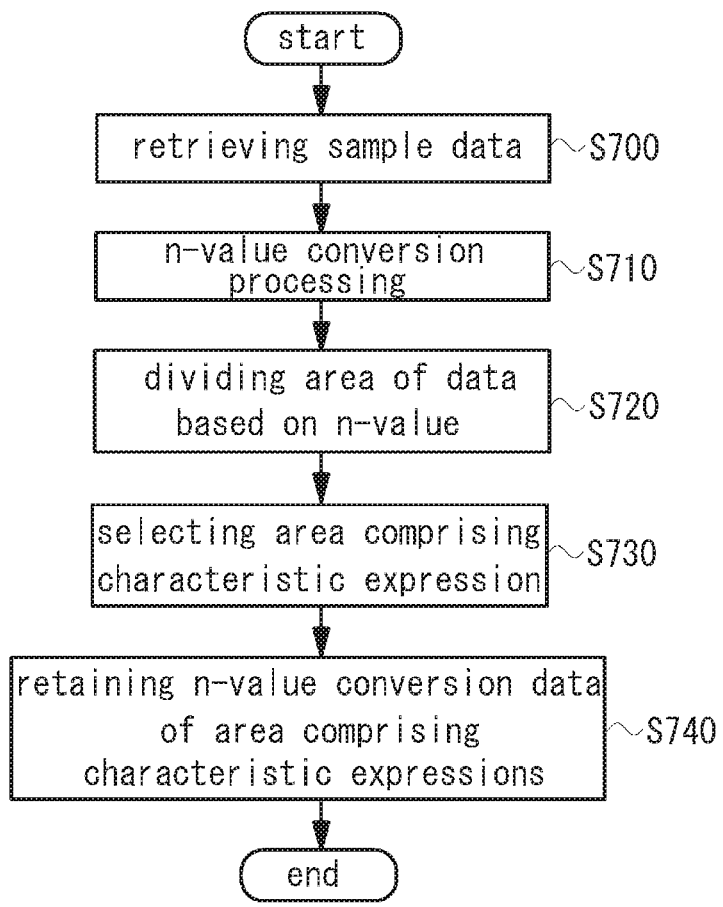
FIG. 14 is a flow chart for explaining operations of the sample/e-mail retrieving section according to a third embodiment of the present invention.

FIG. 14 is a flow chart for explaining operations of the sample/e-mail retrieving section no according to the third embodiment. Firstly, the sample data is retrieved by the data retrieving section 112 (S700), secondly, the sample data is converted into n-value by the signalizing section 114 (S710). The signalizing section 114 further divides the areas of the sample data based on n-value (S720). For example, areas of the sample data is divided by the boundary of particular value or areas surrounded by the particular value is divided, or areas sandwiched between particular values is divided. The number of division of areas is selected appropriately according to the n-value. Next, the signalizing section 114 selects area(s) including characteristic expressions from the divided areas (S730), and stores n-value conversion data of the selected areas including characteristic expressions in the sample storage section 120 (S740).

Figure 15:
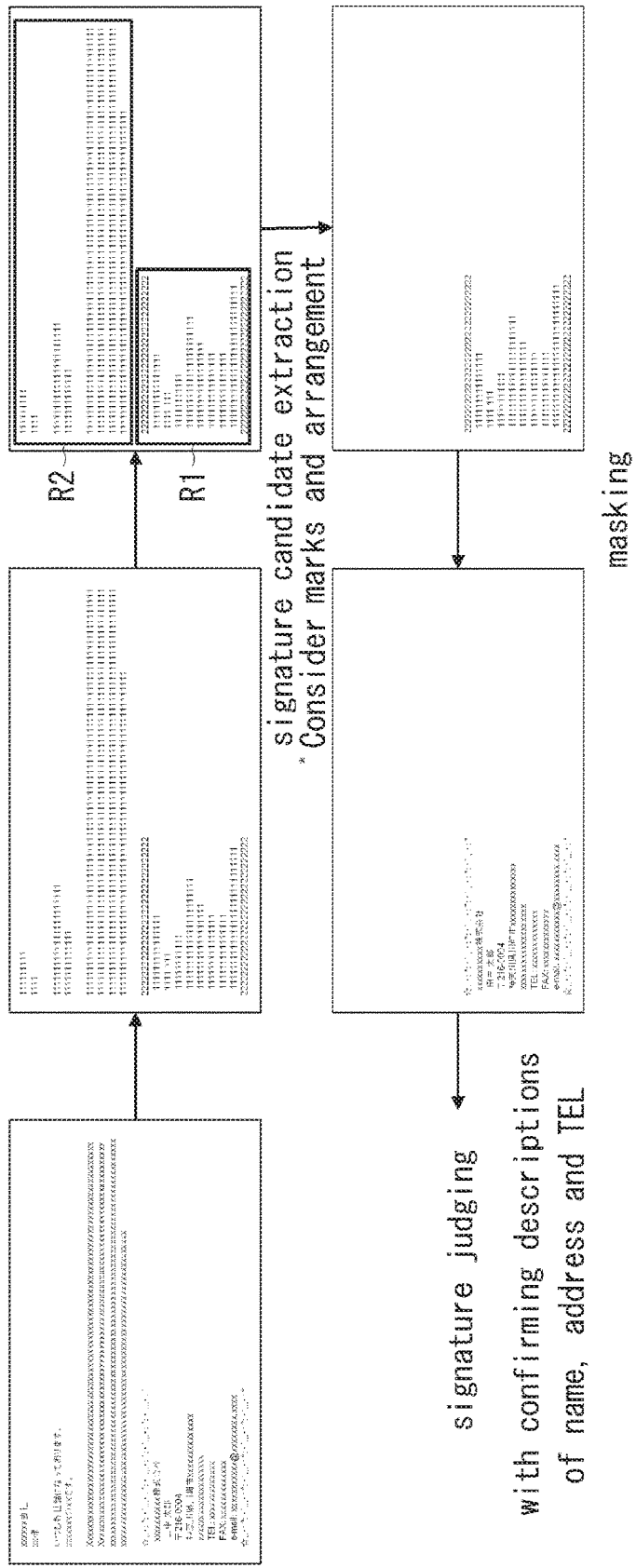
FIGS. 15A-15E show a specific process example of the third embodiment.

Next, a specific processing of the third embodiment will be explained in reference to FIGS. 15A-15E. First, the sample data as shown in FIG. 15A is retrieved. In this example, the signatures described in latter part of the sample data is treated as characteristic expressions. The signalizing section 114, as shown in FIG. 15B, converts the special characters with ordinality described in the signature into data "2", the other characters etc. into data "1", and the blank areas into data "0" ("0" is omitted in drawing). That is, the signalizing section 114 converts the data into 3-value.

Next, the areas of the sample data with 3-value is divided. As shown in FIG. 15C, the sample data is divided into area R1 where the signature is described and area R2 where the mail body is described. Here, data "2" represents the boundary of characteristic expressions, it is divided into area R1 surrounded by data "2" and the other area R2. The signalizing section 114 selects area R2 including the characteristic expressions from the area R1 and the area R2. This selection is, as shown in FIG. 15D for example, implemented by masking area R1 and converting data "1" of area R2 into data "0". Next, the signalizing section 114 stores the binarized data in area R1 in the sample storage section 120. In addition, in order to see if area R1 includes the characteristic expression, as shown in FIG. 15E, the expressions described in area R1 may be outputted at a display for user' final confirmation and stored in the sample storage section 120 after the final confirmation.

Thus, the spam judgement for the e-mail and the extraction of the similar structure document can be implemented by using only the characteristic expressions stored in the sample storage section 120. In this example, the characteristic expressions is the signature, so the e-mail which includes the same signature is considered the spam mail, or the same signature can be extracted from lots of sample data.

Next, a fourth embodiment according to the present invention will be explained. The fourth embodiment makes clustering (divides into subsets) the spam mails by using the signalized data to extract features of a sender (hereinafter referred to a spammer) who sends spam mail. Also in the fourth embodiment, the signalized sample data is stored in the sample storage section 120 in accordance with functions of the mail processing apparatus in FIG. 1A according to the first embodiment.

Figure 16:
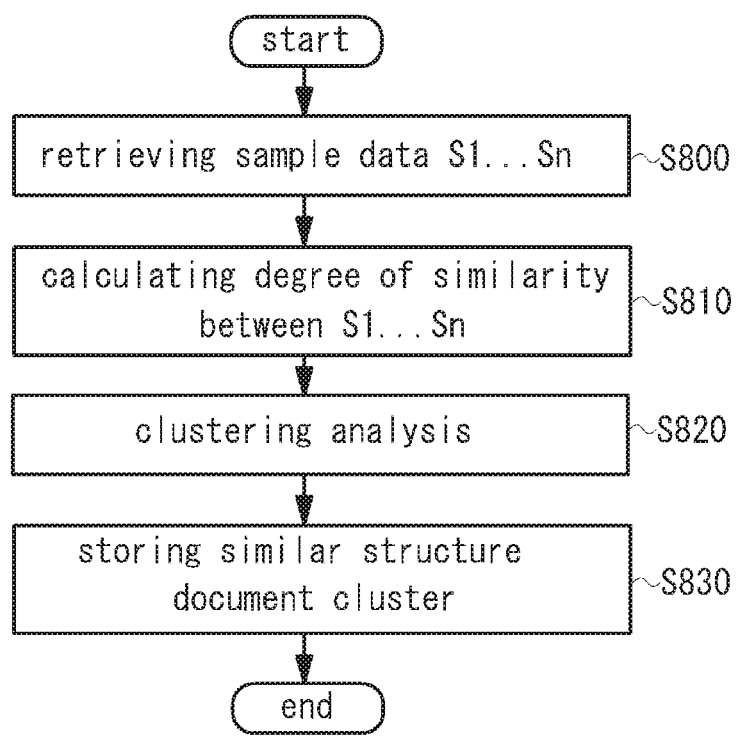
FIG. 16 is a flow chart for explaining operations of the sample/e-mail retrieving section according to a fourth embodiment of the present invention.

FIG. 16 is a flow chart for explaining operations of the signal processing section 130 in the fourth embodiment. The signal processing section 130 according to this embodiment includes a function for performing clustering analysis of the sample data stored in the sample storage section 120, in addition to the function for judging whether the e-mail is spam mail according to the first embodiment. The clustering analysis may be performed at arbitrary timing, for example, it may be executed for predetermined interval or in response to an instruction from a user.

First, the signal processing section 130 retrieves the signalized sample data S1 Tn (spam mail) stored in the sample storage section 120 (S800). In other words, the signal processing section 130 retrieves n number of sample data when n number of sample data is stored in the sample storage section 120. Next, the signal processing section 130 calculates the degree of similarity between the retrieved sample data S1 . . . Sn in mutual (S810) to compare the calculated degree of similarity with the predetermined threshold, and performs the clustering analysis for the sample data (S820). Next, the signal processing section 130 stores the clustered sample data as a similar document structure in a memory (S830).

FIGS. 17A and 17B explain the calculation of the degree of similarity and the clustering analysis. FIG. 17A represents the degree of similarity between the sample data in mutual in a matrix assuming that the number of sample data is 7 (n=7). After the calculation of the degree of similarity between the sample data, the clustering of the sample data is performed based on the degree of similarity. FIG. 17B is an example showing the clustering based on the degree of similarity in FIG. 17A. For example, if the threshold is 90%, S1, S3 and S6 are classified into cluster C1, S2 and S4 are classified into cluster C2, and S5 and S7 are classified into cluster C3. Since the sample data included in one cluster is similar to each other, one cluster is a group of the similar document structure of the sample data.

Figures 18A, 18B, 18C:
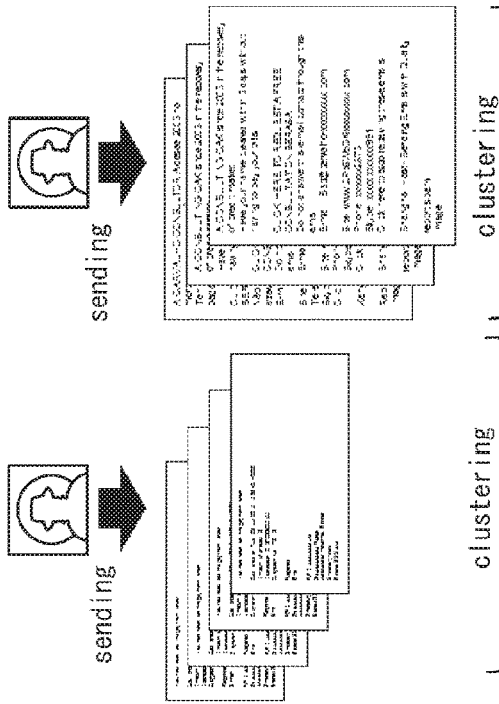
FIGS. 18A-18C explain an application of the cluster of similar document structures.

FIGS. 18A-18C show an application of the similar document structure cluster. For example, as shown in FIG. 18A, assuming that spammer (A) sends the sample data S1, S3 and S6. In such case, extracting features from cluster C1, for example, mail sending time, sender IP address, URL and/or domain in the document etc. allows to learn of sending pattern, in possession of URL and domain of the spammer (A). Similarly for spammer (B) and (C), clustering the sample data sent from the spammer (B) and (C) allows to learn the sending pattern of the spammer (B) and (C). Such sending patterns are utilized for judging the spam mail, which makes judgement accuracy improved.

Figure 19:
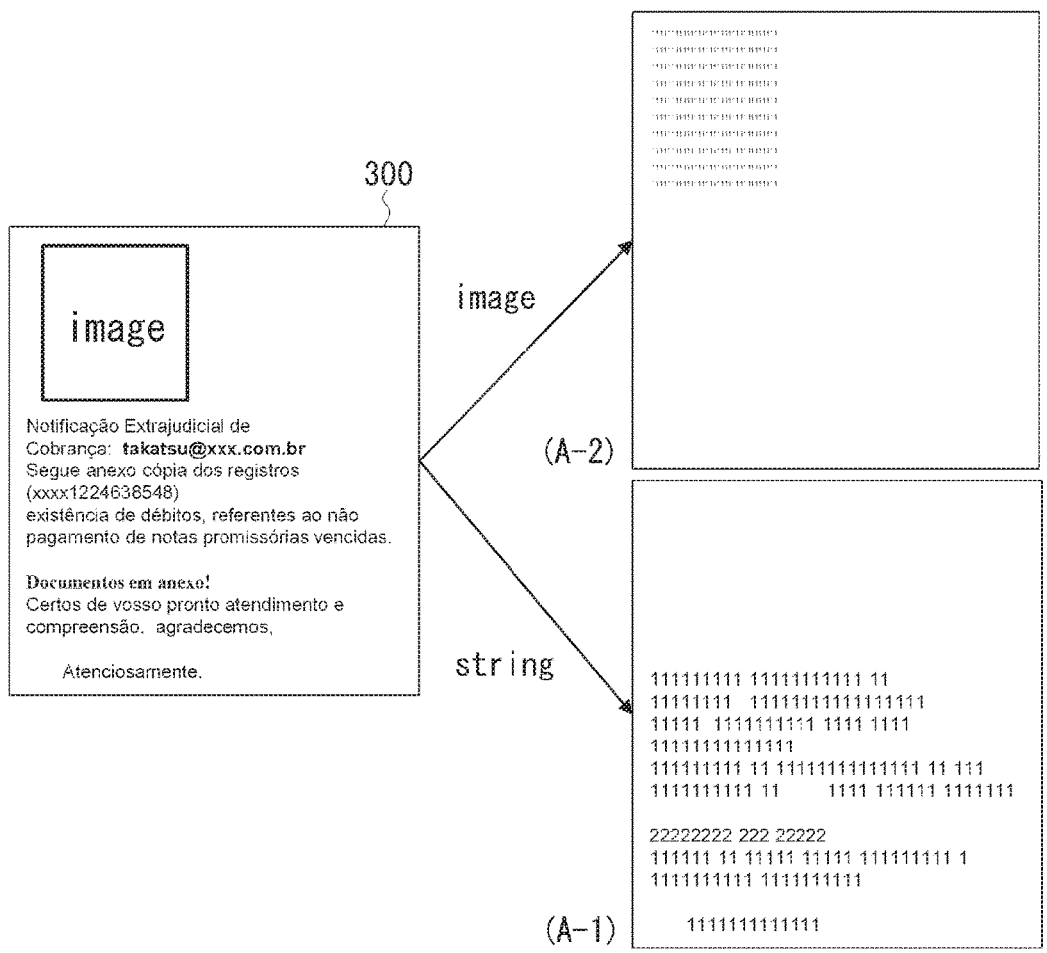
FIG. 19 explains a signalization of HTML mail according to the embodiments of the present invention.

The above embodiments exemplify that the e-mail or the document data is described with text data, however the mail processing apparatus of the present invention is not limited to such the text data. For example as shown in FIG. 19, a HTML mail 300 combines image data and document data is also applied with the mail processing apparatus of the present invention. The HTML mail 300 is retrieved by the data retrieving section 112, then the signalizing section 114 classifies the HTML mail into dimension (A-1) of the letter strings and dimension (A-2) of the image, binarizes each dimension, and stores the binarized sample data in the sample storage section 120. The degree of similarity of each dimension is calculated by using the stored sample data to judge whether or not the e-mail received at HTML format is spam mail.

In the above, desirable embodiments of the present invention have been explained in detail, however the invention is not limited to the particular embodiments and may be modified and changed within the scope of the inventions defined in the claims.

What is claimed is:

1. A document structure analysis device comprising:
   retrieving means for retrieving sample data including codes representing characters;
   signalizing means for converting the codes for each character of the retrieved sample data into n-value respectively in a data format of P rows*Q columns, where n is a natural number greater than or equal to 2;
   storing means for storing the sample data with n-value converted by the signalizing means;
   calculating means for calculating a degree of similarity based on overlaps between the sample data and an input data by comparing the sample data stored in the storing means with the input data by computing operation, the input data representing characters and converted into n-value in the data format of P rows*Q columns by the signalizing means; and
   classifying means for classifying the input data based on the calculated degree of similarity, wherein the retrieving means identifies the sample data or the input data.

2. The document structure analysis device according to claim 1, wherein the signalizing means is configured to convert the characters including characteristic expressions into data other than binarized data before binarization of the codes representing the characters and to binarize the characters excepting the characteristic expressions.

3. The document structure analysis device according to claim 1, wherein the signalizing means is configured to convert the retrieved sample data into n-dimension and then convert n-dimensioned data into n-value respectively, wherein the calculating means is configured to calculate a degree of similarity of n-value data of same dimensions and to calculate a total degree of similarity for each dimension, and wherein the classifying means is configured to classify the input data based on the total degree of similarity.

4. The document structure analysis device according to claim 1, wherein the signalizing means is configured to convert areas where characteristic expressions are described and other areas into data value in difference respectively.

5. The document structure analysis device according to claim 1, wherein the signalizing means is configured to converts the sample data into n-dimension based on attributions of characters.

6. The document structure analysis device according to claim 1, wherein the signalizing means is configured to divide the sample data into n-dimension based on a kind of characters.

7. The document structure analysis device according to claim 1, wherein the signalizing means is configured to divide the sample data into n-dimension based on arrangements of characters.

8. The document structure analysis device according to claim 1, wherein the input data is an e-mail and the classifying means classifies the e-mail into a spam mail.

9. The document structure analysis device according to claim 1, further comprising clustering means for clustering the sample data with n-value stored in the storing means, the clustering means is configured to calculate a degree of similarity between the retrieved sample data and to cluster by comparing the calculated degree of similarity with a predetermined threshold.

* * * * *